United States Patent Office 3,211,729
Patented Oct. 12, 1965

3,211,729
1:2:4-TRIAZINE COMPOUNDS
Adolf Emil Siegrist and Hans-Rudolf Biland, Basel, and Max Duennenberger, Birsfelden, Switzerland, assignors to Ciba Limited, Basel, Switzerland, a company of Switzerland
No Drawing. Filed Mar. 21, 1962, Ser. No. 181,479
Claims priority, application Switzerland, Mar. 28, 1961, 3,684/61
9 Claims. (Cl. 260—248)

The present invention relates to valuable new 1:2:4-triazine compounds which, like for instance the compound of the formula (1)

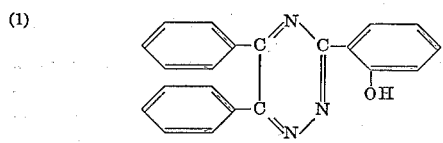

corresponds to the general formula (2)

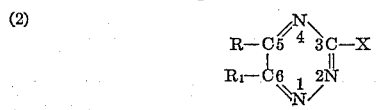

in which R and $R_1$ each represents a benzene or pyridine radical and X a benzene radical containing a hydroxyl group in ortho-position to the bond with the triazine ring.

Among the new 1:2:4-triazine compounds of the above formula those are particularly valuable which correspond to the general formula (3)

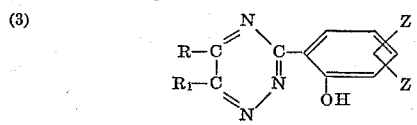

in which Z represents a hydrogen or halogen atom, preferably chlorine, or a lower alkyl group with 1 to 4 carbon atoms and R and $R_1$ are identical and each represents a pyridine radical, for example an α-pyridyl group, a 3:4-methylenedioxyphenyl group or a benzene radical of the formula (4)

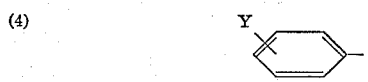

in which Y represents a hydrogen or a halogen atom such as bromine or more especially chlorine, a hydroxyl group or a lower alkyl or alkoxy group with 1 to 4 carbon atoms such, for example, as a methyl or methoxy group.

The new 1:2:4-triazine compounds of the above general Formula 2 are obtained by known methods, for example by condensing at an elevated temperature 1 molecular proportion of a 1:2-diketone of the general formula (5)

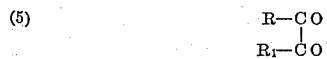

in which R and $R_1$ each represents a benzene or pyridine radical with 1 molecular proportion of a monocarboxylic acid hydrazide of the general formula (6)         $H_2N—NH—CO—X$ in which X represents a benzene radical containing a hydroxyl group in ortho-position to the bond with the —CO group in glacial acetic acid with addition of an ammonia donor, preferably ammonium acetate.

The 1:2-diketones of the Formula 5 and the monocarboxylic acid hydrazides of the Formula 6 are either known or can be prepared by known methods. Particularly suitable starting materials are, for example, the 1:2-di-ketones of the Formula 5 in which R and $R_1$ are identical and each represents a pyridine radical, for example an α-pyridyl group, or a benzene radical of the formula (4)

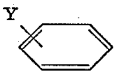

in which Y represents a hydrogen or a halogen atom such as bromine or more especially chlorine, or a hydroxyl group or a lower alkyl or alkoxy group with 1 to 4 carbon atoms, for example the 1:2-diketones of the formulae (7)

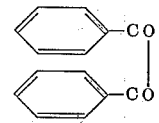

(8)

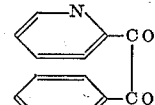

(9)

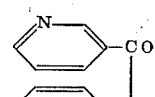

(10)

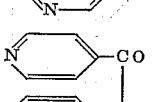

(11)

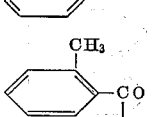

(12)

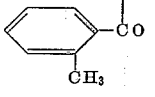

(13)

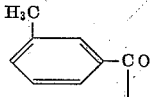

(14)

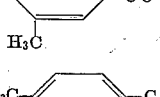

(15)

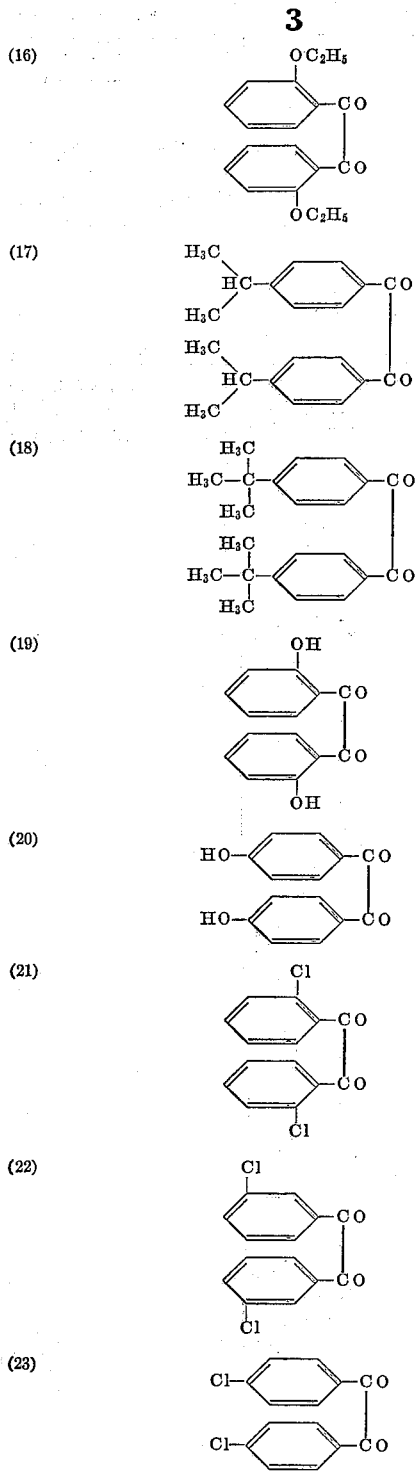

As further starting material there is used a monocarboxylic acid hydrazide of the formula (6)   $H_2N-NH-CO-X$ in which X represents a benzene radical containing a hydroxyl group in ortho-position to the bond with the —CO group, for example 2-hydroxybenzoic acid hydrazide (salicylic acid hydrazide), 2-hydroxy-5-($C_1$-$C_4$)-alkyl-benzoic acid hydrazides such as 2-hydroxy-5-methyl- or tertiary butyl-benzoic acid hydrazide, or 2-hydroxy-3:5-dichlorobenzoic acid hydrazide.

The new 1:2:4-triazine compounds of the invention having the constitution defined above can be used as light screening agents for protecting a wide variety of organic materials.

Quite generally speaking there are three ways in which the new triazines can be used, either separately or in combination, namely:

(A) The light screening agent is incorporated in a substratum to protect the latter from attack by ultra-violet light with a view to preventing changes in one or several physical properties such, for example, as discoloration, impairment of the tear strength, embrittlement and the like, and/or chemical reactions induced by ultra-violet rays such as oxidation phenomena. The light screening agent may be incorporated before or during the manufacture of the substratum or subsequently by way of a known method, such as a fixation method similar to a dyeing operation.

(B) The light screening agent is incorporated in a substratum with a view to protecting one or several substances contained in the substratum such, for example, as coloring matter, assistants or the like; this may be accompanied by the protection of the substratum itself as described above under (A).

(C) The light screening agent is incorporated in a "filter layer" to protect a substratum placed immediately underneath the "filter layer" or at a distance from the "filter layer" (for example in a shop window) from attack by ultra-violet rays, the "filter layer" being solid (film, foil or dressing) or semi-solid (cream, oil or wax).

As materials that can be protected there may be mentioned:

(a) Lacquers and films of different composition, for example of acetylcellulose, cellulose propionate, cellulose butyrate and cellulose mixtures such, for example, as cellulose acetate-butyrate or cellulose acetate-propionate; also nitrocellulose, vinyl acetate, polyvinyl chloride, copolymers of vinyl chloride and vinylidene chloride, alkyd lacquers, polyethylene, polyamides, polyacrylonitrile, polyesters and the like. Of very special value is the use of the 1:2:4-triazines of the above-defined composition as an ingredient of wrapping materials, more especially the known transparent foils of regenerated cellulose (viscose) or acetyl-cellulose. In this connection it is as a rule of advantage to incorporate the light screening agent in the composition from which said foils are manufactured.

(b) Natural or synthetic resins, for example, epoxy resins, polyester resins, vinyl resins, polystyrene resins, alkyd resins, aldehyde resins such as condensation products of formaldehyde with phenol, urea or melamine, as well as emulsions of synthetic resins (for example oil-in-water or water-in-oil emulsions). In this case it is of advantage to add the light screening agent before or during the polymerization or polycondensation respectively. Furthermore, there may be mentioned synthetic resins reinforced with glass fibers and laminates made therefrom.

(c) Hydrophobic substances containing oils, fats or waxes, such as candles, floor polishes, floor stains or other wood stains, furniture polishes, more especially those which are intended for the treatment of light-colored, possibly bleached, wood surfaces.

(d) Natural rubber-like materials such as rubber, balata, gutta percha or synthetic, vulcanisable materials such as polychloroprene, olefinic polysulfides, polybutadiene or copolymers of butadiene and styrene, or butadiene and acrylonitrile, which may further contain fillers, pigments, vulcanization accelerators and the like and in which the addition of the 1:2:4-triazine delays the ageing and thus prevents changes in the plasticity and the embrittlement.

(e) Cosmetics such as perfumes, dyed and undyed soaps and bath salts, skin and face creams, powders, insect repellants and more especially sunburn oils and creams.

(f) For the manufacture of filter layers for photographic purposes, more especially for use in color photography.

(g) Stable coating and dressing agents for textiles and paper, for example those based on starch or casein or on a synthetic resin, for example prepared from vinyl acetate or derivatives of acrylic acid.

(h) Fibrous materials other than textiles fibers, which may be of animal origin such as feathers, hairs, also furs and skins and leathers made from the latter by natural or chemical tanning, as well as products made therefrom; also fibrous materials of vegetable origin such as straw, wood, woodpulp or fibrous materials consisting of densified fibers such as paper, cardboard or chipboard, as well as materials made from the latter. Furthermore, for the manufacture of paper pulp used in paper production (e.g., Hollander pulp).

(i) Furthermore, also textile materials which may be in any desired form, for example, as fibers, filaments, yarns, woven or knitted fabrics or as felt, and all products made therefrom. Such textile materials may consist of: Natural materials of animal origin such as wool or silk, or of vegetable origin such as cellulose materials of cotton, hemp, flax, linen, jute and ramie; furthermore of semi-synthetic materials such as regenerated cellulose, for example rayon, viscoses, including spun rayon; or of synthetic materials obtained by polymerization or co-polymerization (for example polyacrylonitrile) or by poly-condensation, such as polyesters and above all polyamides. In the case of semi-synthetic materials it is of advantage to incorporate the light screening agent already in the spinning composition (for example the viscose spinning composition, or the acetylcellulose [including cellulose triacetate] spinning composition). In the case of fully synthetic fibers the light screening agent is incorporated in the composition from which such fibers are made (for example polyamide melts or polyacrylonitrile spinning compositions) before, during or after the polycondensation or polymerization respectively.

It will be readily understood that the 1:2:4-triazines can be used as light screening agents not only for colorless but also for colored or pigmented materials. In such a case the light protection achieved extends also to the coloring matter so that in some cases a very substantial increase in light fastness is obtained. If desired, the treatment with the light screening agent may be combined with the coloring or pigmenting operation.

Depending on the type of organic material to be treated, the demands made on the efficiency and permanence of the effect and other factors the amount of light screening agent to be incorporated in the material under treatment may vary within relatively wide limits. As a rule the amount required is about 0.01 to 5%, preferably from 0.1 to 2%, of the weight of the organic material to be directly protected from ultra-violet rays.

Unless otherwise indicated, parts and percentages in the following examples are by weight.

*Example 1*

A mixture of 21.0 parts of benzil, 15.2 parts of salicylic acid hydrazide, 200 parts of ammonium acetate and 200 parts by volume of glacial acetic acid is stirred under reflux for 1 hour, during which the reaction product settles out in crystalline form. After cooling, the batch is suction-filtered, the filter residue is washed with glacial acetic acid, water and ethanol and dried. Yield: about 28.2 parts (corresponding to 86.6% of the theoretical) of the compound of the Formula 1 in the form of light-yellow crystals which, after having been recrystallized three times from dimethylformamide+ethanol, melt at 174–175° C.

*Analysis.*—$C_{22}H_{17}ON_3$, molecular weight: 339.38.

|  | C | H | N |
|---|---|---|---|
| Calculated, percent | 77.52 | 4.65 | 12.92 |
| Found, percent | 77.43 | 4.40 | 12.79 |

Ultra-violet absorption in ethanol:

$\lambda_{max}=333m\mu$ ($\epsilon=15400$)
$=380m\mu$ ($\epsilon=24600$).

By an analogous condensation the 1:2:4-triazine compounds described below are obtained:

(24)

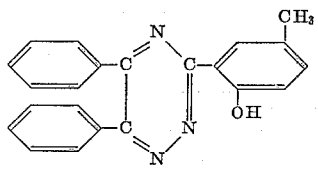

Light-yellow, shiny platelets from dimethylformamide+ethanol. Melting at 187–188° C.
Ultra-violet absorption in ethanol:

$\lambda_{max}=342m\mu$ ($\epsilon=1300$)
$=283m\mu$ ($\epsilon=25800$).

*Analysis.*—$C_{22}H_{17}ON_3$, molecular weight: 339.38.

|  | C | H | N |
|---|---|---|---|
| Calculated, percent | 77.85 | 5.05 | 12.38 |
| Found, percent | 77.55 | 5.33 | 12.55 |

(25)

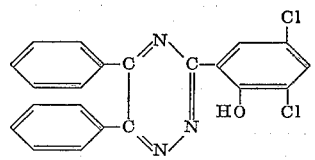

Yellow, shiny needles from dimethylformamide+ethanol. Melting at 178–179° C.
Ultra-violet absorption in ethanol:

$\lambda_{max}=344m\mu$ ($\epsilon=13800$)
$=279m\mu$ ($\epsilon=24200$).

*Analysis.*—molecular weight: 394.26.

|  | C | H | N |
|---|---|---|---|
| Calculated, percent | 63.98 | 3.32 | 10.66 |
| Found, percent | 63.94 | 3.38 | 10.59 |

(26)

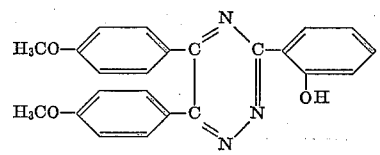

Yellow crystals from chlorobenzene+ethanol. Melting at 176–177° C.
Ultra-violet absorption in ethanol:

$\lambda_{max}=335m\mu$ ($\epsilon=23800$)
$=291m\mu$ ($\epsilon=20200$).

*Analysis.*—$C_{23}H_{19}O_3N_3$, molecular weight: 385.41.

|  | C | H | N |
|---|---|---|---|
| Calculated, percent | 71.67 | 4.97 | 10.90 |
| Found, percent | 71.54 | 4.93 | 10.91 |

(27)

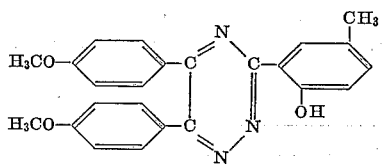

Yellow crystals from methylene chloride+cyclohexane. Melting at 163–164° C.

Ultra-violet absorption in ethanol:

$\lambda_{max}$=348 m$\mu$ ($\epsilon$=22400)
=291 m$\mu$ ($\epsilon$=21600)
=223 m$\mu$ ($\epsilon$=27000).

*Analysis.*—$C_{24}H_{21}O_3N_3$, molecular weight: 399.43.

|  | C | H | N |
|---|---|---|---|
| Calculated, percent | 72.16 | 5.30 | 10.52 |
| Found, percent | 72.25 | 5.32 | 10.38 |

(28)

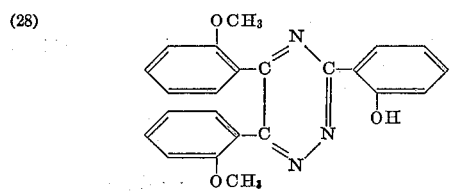

Light-yellow crystals from chlorobenzene+cyclohexane. Melting at 151–152° C.

Ultra-violet absorption in ethanol:

$\lambda_{max}$=334 m$\mu$ ($\epsilon$=16400)
=276 m$\mu$ ($\epsilon$=21400).

*Analysis.*—$C_{23}H_{19}O_3N_3$, molecular weight: 385.41.

|  | C | H | N |
|---|---|---|---|
| Calculated, percent | 71.67 | 4.97 | 10.90 |
| Found, percent | 71.49 | 4.92 | 10.94 |

(29)

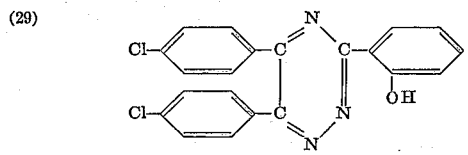

Yellow crystals from methylene chloride+cyclohexane. Melting at 178 to 179° C.

Ultra-violet absorption in ethanol:

$\lambda_{max}$=332 m$\mu$ ($\epsilon$=17200)
=285 m$\mu$ ($\epsilon$=27400).

*Analysis.*—$C_{21}H_{13}N_3OCl_2$, molecular weight: 394.26.

|  | C | H | N |
|---|---|---|---|
| Calculated, percent | 63.98 | 3.32 | 10.66 |
| Found, percent | 64.21 | 3.02 | 10.63 |

(30)

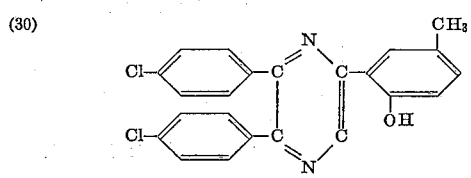

Yellow crystals from methylene chloride+cyclohexane. Melting at 179° C.

Ultra-violet absorption in ethanol:

$\lambda_{max}$=342 m$\mu$ ($\epsilon$=14600)
=288 m$\mu$ ($\epsilon$=29200).

*Analysis.*—$C_{22}H_{15}N_3OCl_2$, molecular weight: 408.29.

|  | C | H | N |
|---|---|---|---|
| Calculated, percent | 64.72 | 3.70 | 10.29 |
| Found, percent | 64.57 | 3.58 | 10.22 |

(31)

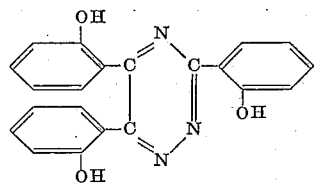

Yellow crystals from chlorobenzene+cyclohexane. Melting at 225 to 226° C.

Ultra-violet absorption in ethanol:

$\lambda_{max}$=336 m$\mu$ ($\epsilon$=17600)
=275 m$\mu$ ($\epsilon$=21800).

*Analysis.*—$C_{21}H_{15}O_3N_3$, molecular weight: 357.35.

|  | C | H | N |
|---|---|---|---|
| Calculated, percent | 70.58 | 4.23 | 11.76 |
| Found, percent | 70.48 | 4.34 | 11.58 |

(32)

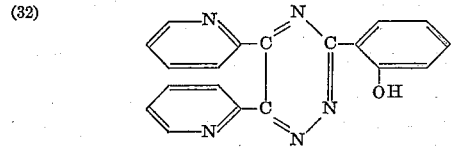

Pale-yellow, small needles from chlorobenzene. Melting at 164° C.

Ultra-violet absorption in ethanol:

$\lambda_{max}$=336 m$\mu$ ($\epsilon$=12500)
=285 m$\mu$ ($\epsilon$=27200).

*Analysis.*—$C_{19}H_{13}ON_5$, molecular weight: 327.33.

|  | C | H | N |
|---|---|---|---|
| Calculated, percent | 69.71 | 4.00 | 21.40 |
| Found, percent | 69.53 | 4.15 | 21.58 |

(33)

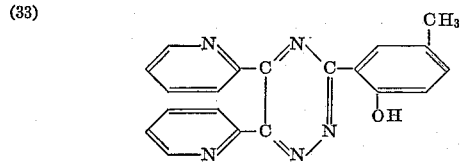

Yellow crystals from methylene chloride+cyclohexane. Melting at 190 to 191° C.

Ultra-violet absorption in ethanol:

$\lambda_{max}$=350 m$\mu$ ($\epsilon$=10600)
=287 m$\mu$ ($\epsilon$=28800).

*Analysis.*—$C_{20}H_{15}ON_5$, molecular weight: 341.36.

|  | C | H | N |
|---|---|---|---|
| Calculated, percent | 70.37 | 4.43 | 20.52 |
| Found, percent | 70.26 | 4.39 | 20.50 |

(34)

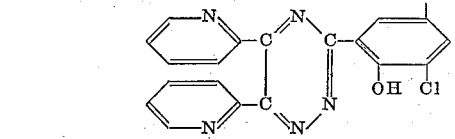

Yellow crystals from ethylene chloride+cyclohexane. Melting at 192.5 to 193° C.

Ultra-violet absorption in ethanol:

$\lambda_{max}$=349 m$\mu$ ($\epsilon$=10300)
=285 m$\mu$ ($\epsilon$=27300).

*Analysis.*—$C_{19}H_{11}ON_5Cl_2$, molecular weight: 396.24.

| | C | H | N |
|---|---|---|---|
| Calculated, percent | 57.59 | 2.80 | 17.68 |
| Found, percent | 57.64 | 2.86 | 17.47 |

(35) 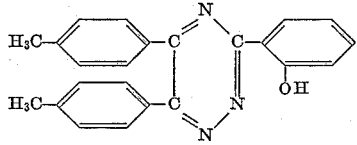

Light-yellow, shiny needles from dimethylformamide+ethanol. Melting at 179–180° C.
Ultra-violet absorption in ethanol:
$\lambda_{max}$=334 m$\mu$ ($\epsilon$=19200)
=283 m$\mu$ ($\epsilon$=23500).
*Analysis.*—$C_{23}H_{19}ON_3$, molecular weight: 353.41.

| | C | H | N |
|---|---|---|---|
| Calculated, percent | 78.16 | 5.42 | 11.89 |
| Found, percent | 78.28 | 5.27 | 11.93 |

(36) 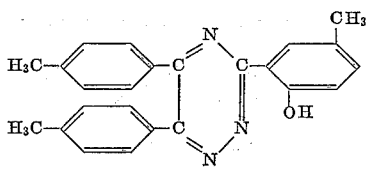

Light-yellow, shiny needles from dimethylformamide+ethanol. Melting at 178–179° C.
Ultra-violet absorption in ethanol:
$\lambda_{max}$=342 m$\mu$ ($\epsilon$=17400)
=284 m$\mu$ ($\epsilon$=25600).
*Analysis.*—$C_{24}H_{21}ON_3$, molecular weight: 367.43.

| | C | H | N |
|---|---|---|---|
| Calculated, percent | 78.45 | 5.76 | 11.44 |
| Found, percent | 78.00 | 5.75 | 11.56 |

(37) 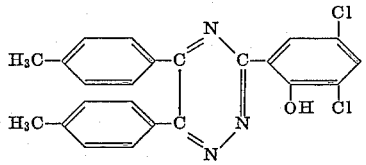

Light-yellow, small needles from dioxane+water. Melting at 220–220.5° C.

Ultra-violet absorption in ethanol:
$\lambda_{max}$=346 m$\mu$ ($\epsilon$=17700)
=283 m$\mu$ ($\epsilon$=22700).

*Analysis.*—$C_{23}H_{17}ON_3Cl_2$, molecular weight: 422.32.

| | C | H | N |
|---|---|---|---|
| Calculated, percent | 65.41 | 4.06 | 9.95 |
| Found, percent | 65.66 | 4.14 | 9.83 |

(38) 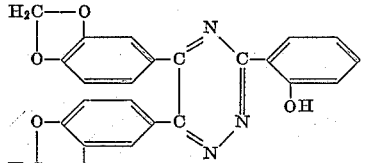

Light-yellow, small crystals from dioxane+water. Melting at 210° C.

Ultra-violet absorption in dioxane:
$\lambda_{max}$=342 m$\mu$ ($\epsilon$=22800)
=264 m$\mu$ ($\epsilon$=20000).

*Analysis.*—$C_{23}H_{15}O_5N_3$, molecular weight: 413.37.

| | C | H | N |
|---|---|---|---|
| Calculated, percent | 66.82 | 3.66 | 10.17 |
| Found, percent | 66.68 | 3.66 | 10.05 |

(39) 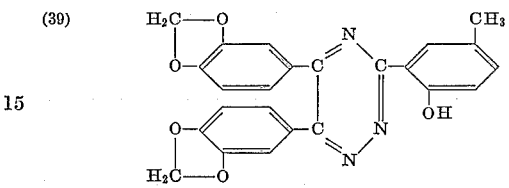

Light-yellow crystalline powder from dimethylformamide+ethanol. Melting at 175–176° C.

Ultra-violet absorption in dioxane:
$\lambda_{max}$=351 m$\mu$ ($\epsilon$=21800)
=266 m$\mu$ ($\epsilon$=18500).

*Analysis.*—$C_{24}H_{17}O_5N_3$, molecular weight: 427.40.

| | C | H | N |
|---|---|---|---|
| Calculated, percent | 67.44 | 4.02 | 9.83 |
| Found, percent | 67.19 | 4.09 | 9.72 |

*Example 2*

A film about 40$\mu$ thick is made from a solution of 10% strength of acetylcellulose in acetone containing 1% (calculated from the acetylcellulose) of 3-(2'-hydroxyphenyl)-5:6-diphenyl-1:2:4-triazine of the formula (1) 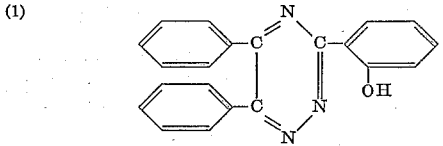

After drying, one portion of the film so produced is exposed for 100 hours in a fadeometer. The permeability to ultra-violet light of the unexposed portion and the exposed portion of the film display the following values measured with a Beckman DU spectrophotometer:

| Film | Permeability to ultra-violet light in percent | | | | | At $\lambda$ |
|---|---|---|---|---|---|---|
| | 0 | 5 | 10 | 25 | 50 | |
| Unexposed | 250–350 | 363 | 368 | 376 | 390 | m$\mu$ |
| Exposed | 250–350 | 362 | 367 | 375 | 390 | |

*Example 3*

1.0 part of the compound of the formula

(26) 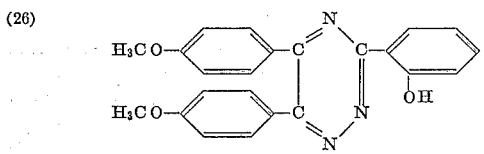

is dissolved in 100 parts by volume of sodium hydroxide solution of 3% strength and 100 parts by volume of ethanol, whereupon 3000 parts of water and 3 parts of an aqueous solution of the adduct of 35 mols of ethylene oxide with 1 mol of stearyl alcohol are added. The resulting solution is neutralized with sulfuric acid of 10% strength while continually checking with a potentiometer until the pH value of 7 is reached, whereupon a fine dispersion is obtained. 100 parts of a fabric of polyamide fibers, prepared from hexamethylene diamine and adipic acid, are immersed in this dispersion at room temperature, the whole is slowly raised to the boil and the fabric is treated for another hour at the boil, then removed from the bath, rinsed in cold water and dried. After having been irradiated for 100 hours with a xenon lamp the fabric treated in this manner displays a much smaller loss in tear strength than when the compound of the Formula 26 is not added.

Similar, good results are obtained when the compound of the Formula 26 is replaced by one of the compounds of the Formulae 1, 24, 25 or 27 to 34.

*Example 4*

A paste consisting of 100 parts of polyvinyl chloride, 3 parts of stabilizer, 59 parts by volume of dioctyl phthalate and 0.2 part of the compound of the Formula 26 is rolled on a calender at 150 to 155° C. to form a foil. The polyvinyl chloride produced in this manner absorbs completely in the ultra-violet range of 280 to 370 mμ.

*Example 5*

In a Hollander a paper pulp is prepared from 150 parts of bleached sulfite or sulfate cellulose,
60 parts of zinc sulfide,
6 parts of aluminum sulfate,
3 parts of a finely dispersed aqueous paste containing 25% of the azo pigment of the formula

(40)
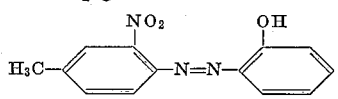

and about 5000 parts of water.

The paper made from the above pulp is immersed in a bath prepared from 100 parts of a powdered, curable, water-soluble condensation product of 1 mol of melamine with about 2 mols of formaldehyde, and
100 parts by volume of a mixture prepared from a solution of 1 part of the 1:2:4-triazine of the Formula 32 in 19 parts by volume of ethanol by dilution with water to make 100 parts by volume.

After having removed the excess resin solution, the paper is dried.

The paper manufactured in this manner is placed on a support of tissue paper impregnated with the melamine resin of the above constitution, a sheet of phenol paper and a sheet of filter paper prepared with the melamine resin of the above constitution as interlayer, and the sandwich is pressed for 10 minutes at 140 to 150° C. with a pressure of 75 kg. per cm.$^2$.

On being exposed in a fadeometer the resulting laminate displays a substantially better fastness to light than a comparable product that does not contain the triazine compound of the Formula 32.

When the light screening agent used in the above example is added only to the melamine resin bath used for impregnating the tissue paper, a similar, valuable improvement in fastness to light is achieved.

*Example 6*

10,000 parts of chipped polyamide, prepared in known manner from hexamethylene diamine adipate, are mixed with 30 parts of titanium dioxide (rutile modification) and 50 parts of the compound of the Formula 1 or 30 in a tumbler for 12 hours. The chips treated in this manner are then melted in a boiler heated with oil to 300 to 310° C. after having displaced the atmospheric oxygen from the latter by means of saturated steam, and the whole is stirred for ½ hour. The melt is then expressed through a spinneret under a nitrogen pressure of 5 atmospheres (gauge), and after cooling the filament spun in this way is reeled up on a spinning bobbin. The tear strength of the resulting threads after stretching is much less impaired by light than that of filaments spun in identical manner but without adding the triazine of the Formula 1 to 30.

What is claimed is:

1. A 1:2:4-triazine compound of the formula

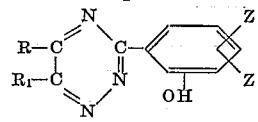

wherein R and $R_1$ each stand for a member selected from the group consisting of the pyridine radical, a benzene radical of the formula

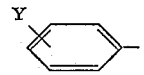

wherein Y is a member selected from the group consisting of halogen, hydroxyl, lower alkyl and lower alkoxy with 1 to 4 carbon atoms and the benzene radical of the formula

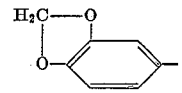

and Z represents a member selected from the group consisting of hydrogen, halogen and lower alkyl with 1 to 4 carbon atoms.

2. The 1:2:4-triazine compound of the formula

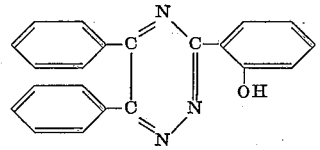

3. The 1:2:4-triazine compound of the formula

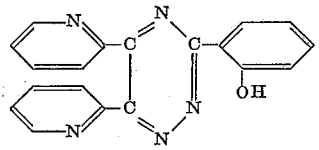

4. The 1:2:4-triazine compound of the formula

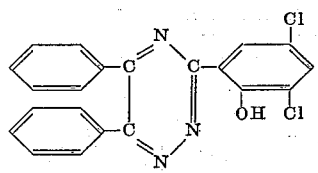

5. The 1:2:4-triazine compound of the formula

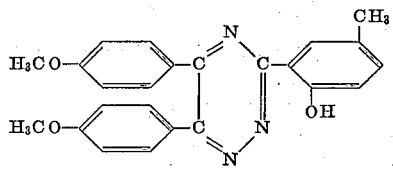

6. The 1:2:4-triazine compound of the formula

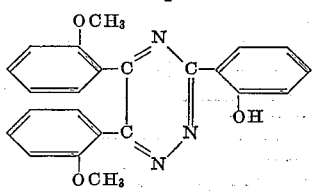

7. The 1:2:4-triazine compound of the formula

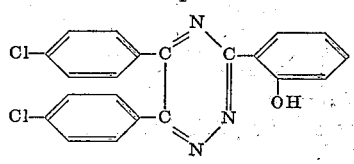

8. The 1:2:4-triazine compound of the formula

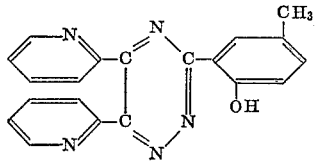

9. The 1:2:4-triazine compound of the formula

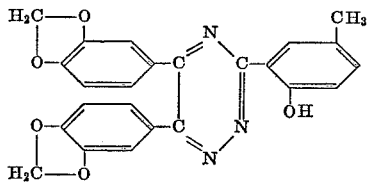

References Cited by the Examiner

UNITED STATES PATENTS

| | | | |
|---|---|---|---|
| 2,160,293 | 5/39 | Shoemaker et al. | 260—248 X |
| 2,489,358 | 11/49 | Wolf et al. | 260—248 |
| 2,763,566 | 9/56 | Van Allan | 117—33.3 |
| 3,113,942 | 12/63 | Johns et al. | 260—248 |
| 3,113,943 | 12/63 | Johns et al. | 260—248 |
| 3,118,887 | 1/64 | Hardy et al. | 260—248 |

OTHER REFERENCES

German Auslegeschrift, 1,099,846, Feb. 16, 1961.
Laakso et al., Tetrahedon, vol. 1, pages 103 to 118 (1957).

WALTER A. MODANCE, *Primary Examiner.*
DUVAL T. McCUTCHEN, JOHN D. RANDOLPH,
*Examiners.*